(12) United States Patent
Okumachi et al.

(10) Patent No.: US 6,325,378 B1
(45) Date of Patent: Dec. 4, 2001

(54) SHAFT SEAL APPARATUS

(75) Inventors: Eiji Okumachi; Satoshi Fujiwara; Toshihiko Fuse, all of Hyogo-ken (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/281,281

(22) Filed: Mar. 30, 1999

(30) Foreign Application Priority Data

Apr. 1, 1998 (JP) .................................................. 10-089045
Apr. 3, 1998 (JP) .................................................. 10-092101

(51) Int. Cl.[7] .............................. F16J 15/34; F16J 15/54
(52) U.S. Cl. .......................................... 277/348; 277/408
(58) Field of Search ............................... 277/358, 399, 277/400, 401, 408, 352, 348, 423, 429

(56) References Cited

U.S. PATENT DOCUMENTS

| 1,315,822 | * | 9/1919 | Doran | 277/401 |
|---|---|---|---|---|
| 1,876,515 | * | 9/1932 | Emmet | 277/399 |
| 3,661,398 | * | 5/1972 | Hummer | 277/401 |
| 3,675,935 | * | 7/1972 | Ludwig et al. | 277/358 |
| 3,759,532 | * | 9/1973 | Lindeboom | 277/400 |
| 3,804,424 | * | 4/1974 | Gardner | 277/401 |
| 3,813,103 | * | 5/1974 | Wiese | 277/399 |
| 3,837,659 | * | 9/1974 | Moncrief | 277/400 |
| 4,375,871 | * | 3/1983 | Romanauskas | 277/400 |
| 4,523,764 | * | 6/1985 | Albers et al. | 277/400 |
| 4,529,209 | * | 7/1985 | Nii et al. | 277/358 |
| 4,961,678 | * | 10/1990 | Janocko | 277/358 |
| 5,133,562 | * | 7/1992 | Lipschitz | 277/400 |

* cited by examiner

Primary Examiner—Anthony Knight
Assistant Examiner—Vishal Patel
(74) Attorney, Agent, or Firm—Griffin & Szipl, P.C.

(57) ABSTRACT

A shaft sealing apparatus 109 comprising a seal case 1 mounted on a tank shell 102 of rotary equipment, a rotary seal ring 3 fixed to the rotary shaft 106 of the rotary equipment, a stationary seal ring 4 held in the seal case 1 opposite to the rotary seal ring 3 and movable in the axial direction, a coil spring 5 to thrust the stationary seal ring 4 against the rotary seal ring 3, a gas feeding channel 6 formed out of a series of gas passages running through the seal case 1 and the stationary seal ring 4 and opening between the two seal end faces 31, 41 of the two seal rings 3, 4, and a gas jetting mechanism to jet, selectively, a seal gas 71 such as nitrogen and a sterilization gas 72 such as steam through the gas feeding channel 6 into between the seal end faces 31, 41. In normal operation, the shaft seal apparatus 109 functions to seal at the relatively rotating portions of the end faces 31, 41 of the seal rings 3, 4, while holding the seal ends 31, 41 in a non-contact state, by jetting a seal gas 71 such as nitrogen into between the two seal end faces 31, 41. In sterilization mode, a sterilization gas 72 such as steam is jetted into between the two seal end faces 31, 41 instead of the seal gas 71, sterilizing at least the gas feeding channel 6 and the seal end faces 31, 41.

4 Claims, 5 Drawing Sheets

SHAFT SEAL APPARATUS

CROSS-REFERENCE TO RELATED APPLICATIONS

This application is related to and claims the early filing date of Japanese Patent Applications No. 10-089045, filed Apr. 1, 1998 and No. 10-092101, filed Apr. 3, 1998.

FIELD OF THE INVENTION

This invention relates to a shaft seal apparatus. The shaft seal apparatus of the present invention is employed in rotary equipment such as stirrers and mixers that are intended for use in the manufacture of pharmaceuticals, foodstuffs, and the like.

BACKGROUND OF THE INVENTION

Figure 5:
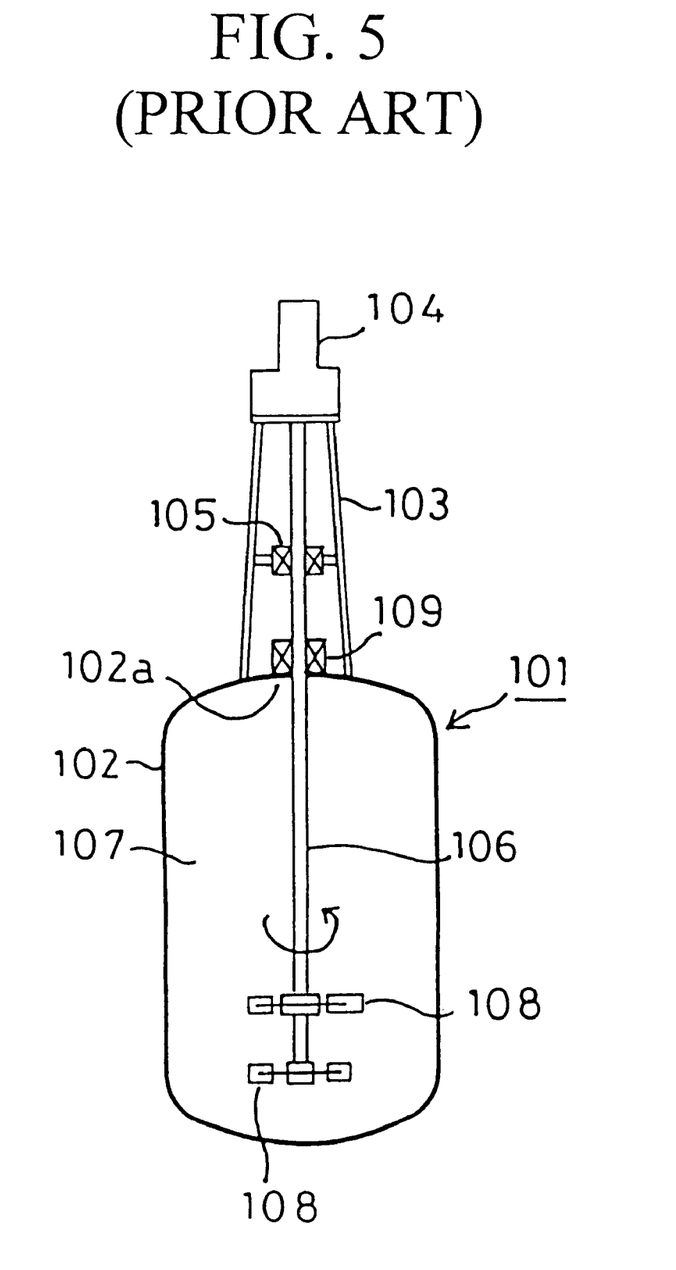
FIG. 5 is a vertical, sectional schematic view of an example of rotary equipment on which the shaft seal apparatus is mounted.

A vertical type stirrer or agitator 101 as shown in FIG. 5 is used in the production of fermented products such as, for instance, fermented drinks. This stirrer 101 has a motor-supporting frame 103 set up on a tank shell 102 forming a fermentation tank, a motor (with a reducer, etc.) 104 mounted on the top of the motor-supporting frame 103, and a rotary shaft or stirrer shaft 106 connected to the motor 104. Shaft 104 is supported in a free-rotating state by motor-supporting frame 103 by means of a bearing 105. Shaft 104 extends down inside tank shell 102 and is held vertically in the fermentation tank inner space 107. Shaft 104 is constituted so that agitation propellers 108, 108 mounted at the lower end thereof agitate a treatment material to enhance fermentation in tank inner space 107.

This type of fermentation stirrer 101 is designed so as to prevent fermentation gases generated in tank 107 from leaking out by providing an appropriate shaft seal apparatus 109 between rotary shaft 106 and a rotary shaft penetrating portion 102a of tank shell 102.

Some known types of shaft seal apparatus 109 installed on this type of stirrer 101 are equipped with a single or double end-face contact mechanical seal while others are provided with grand-packings.

The type of shaft seal apparatus equipped with a single mechanical seal (hereinafter referred to as "the first prior art apparatus") has a seal case in the rotary shaft penetrating portion 102a in which a stationary seal ring on the seal case is pressed against a rotary seal ring on the rotary shaft 5. Thus, in the first prior art apparatus, tank inner space 107 is sealed by a sliding contact between the two seal rings rotating relative to one another.

The end-face contact type shaft seal apparatus provided with a double mechanical seal (hereinafter called "the second prior art apparatus") has a pair of mechanical seals, of the same type of the first prior art apparatus, arranged side by side. A sealing fluid region is thus formed between the pair of mechanical seals and keeps the tank inner space 107 air-tight. The sealing fluids used in this type of apparatus include oils and liquids that would cause no problems if they leak into the tank. The type of shaft seal apparatus using oil as sealing fluid is additionally provided with an oil unit where the oil is circulated so as to keep the oil from leaking into the tank inner space from the seal region. This type of shaft seal apparatus is also designed so that the pressure of the oils and liquids (that would cause no problems if they leak into the tank) can be held higher than that inside the tank, to prevent the gas inside the tank (i.e., the fermentation gas) from leaking out into the seal region.

The type of apparatus using a grand-packing (hereinafter name "the third prior art apparatus") has a stuffing box installed in the rotary shaft penetrating position 102a and a number of grand packings, generally braided packings, are arranged side by side in the space between the stuffing box and the rotary shaft 106 to seal the tank inner space 107. Also, a lantern ring is usually provided in the middle of the group of grand-packings, where nitrogen gas is fed.

Rotary equipment such as the aforesaid fermentation stirrers 101, when used with pharmaceuticals, foodstuffs, raw materials to be processed into pharmaceuticals and foodstuffs, and other such materials, require strict hygienic control. They are subjected to sterilization treatment periodically or as necessary by the injection of a sterilization gas, usually high-temperature steam, into the tank inner space 107. In this sterilization treatment, parts of the shaft seal apparatus that face the tank inner space 107 cannot be cleaned well by the sterilization gas which is jetted into the tank alone. Therefore, the same gas is directly jetted onto those parts of the shaft seal apparatus.

In the first and second prior art apparatuses, however, the seal end faces on both sides which are in contact with each other cannot be well sterilized by the jetting of the sterilization gas. Especially in the second prior art apparatus, which is of complicated construction, the sterilization gas cannot reach many parts of the apparatus, which results in grossly insufficient sterilization. Another problem is that since those prior art apparatuses are based on end-face contact type mechanical seals, dust will arise from the contact wearing of the two end faces in operation, which can fall into the tank inner space 107. It is difficult, therefore, to achieve sufficient hygienic control in the tank. The problem with the first prior art apparatus is that the gas in the tank cannot be shut out completely. Toxic or odiferous gases in the tank could contaminate or otherwise damage the environment.

The third prior art apparatus also presents the following problems. The grand-packings cannot be cleaned enough even by jetting a sterilization gas directly at them. Furthermore, the grand-packings produce dust from contact with the rotary shaft 106 in operation, and that dust can fall into the tank inner space 107. For those reasons, sufficient hygienic control in the tank inner space 107 is difficult to effect, as with the first and second prior art apparatuses.

As set forth above, the first through third prior art apparatuses cannot be well-sterilized by hygienic procedures including treatment by jetting sterilization gas. They are accordingly not suitable for use in rotary equipment where strict sanitation is required. The industry would benefit if those problems were addressed.

SUMMARY OF THE INVENTION

It is an object of the present invention to provide a shaft seal apparatus which can completely seal off fermentation gas in a fermentation tank without causing dusting (such as from wearing) and which is fully sterilizable by sterilization gas. A shaft seal apparatus having these attributes is quite suitable for use in rotary equipment where vigorous hygienic control must be exercised.

It is another object of the present invention to provide a shaft seal apparatus the construction of which is simplified to the maximum possible extent by using gas feeding passages formed in a seal case and a stationary seal ring not only as means for generating static pressure by seal gas but also as means for sterilizing a tank by sterilization gas.

It is a further object of the present invention to provide a shaft seal apparatus which affords excellent sealing even in rotary equipment in which a seal case is difficult to mount with precision or in which the shaft vibrates because of the construction or function of the machine.

These objects are achieved by a shaft seal apparatus which comprises a seal case mounted in a rotary shaft penetrating portion of a tank shell of rotary equipment, a rotary seal ring fixed to the rotary shaft of the rotary equipment, a stationary seal ring held in the seal case opposite to the rotary seal ring and movable in the direction of the shaft axis, a thrusting member mounted between the seal case and the stationary seal ring and thrusting the stationary seal ring against the rotary seal ring, a gas feeding channel comprising a series of gas passages running through the seal case and the stationary seal ring and opening between two opposing seal end faces of the two seal rings, and a gas jetting mechanism to jet seal gas or sterilization gas selectively to between the seal end faces from the gas feeding channel.

In normal operation, the shaft seal apparatus functions as sealing at the relatively rotating portion of the end faces of the seal rings while holding the seal ends in a non-contact state by jetting a seal gas in between the two seal end faces. In sterilization mode, a sterilization gas is jetted in between the two seal end faces instead of the seal gas, sterilizing at least the gas feeding channel and the seal end faces.

In a preferred embodiment, the seal gas used is nitrogen compressed to a higher pressure than the pressure in the rotary equipment, and the sterilization gas is steam at the same pressure as the seal gas.

It is also noted that deterioration or loss of sealing performance due to vibration of the rotary shaft is avoided by engaging the seal case and the rotary shaft by means of a bearing or a similar coupling member such that the two are rotatable relative to one another but unchangeable in position relative to each other.

DETAILED DESCRIPTION OF THE INVENTION

Figure 1:
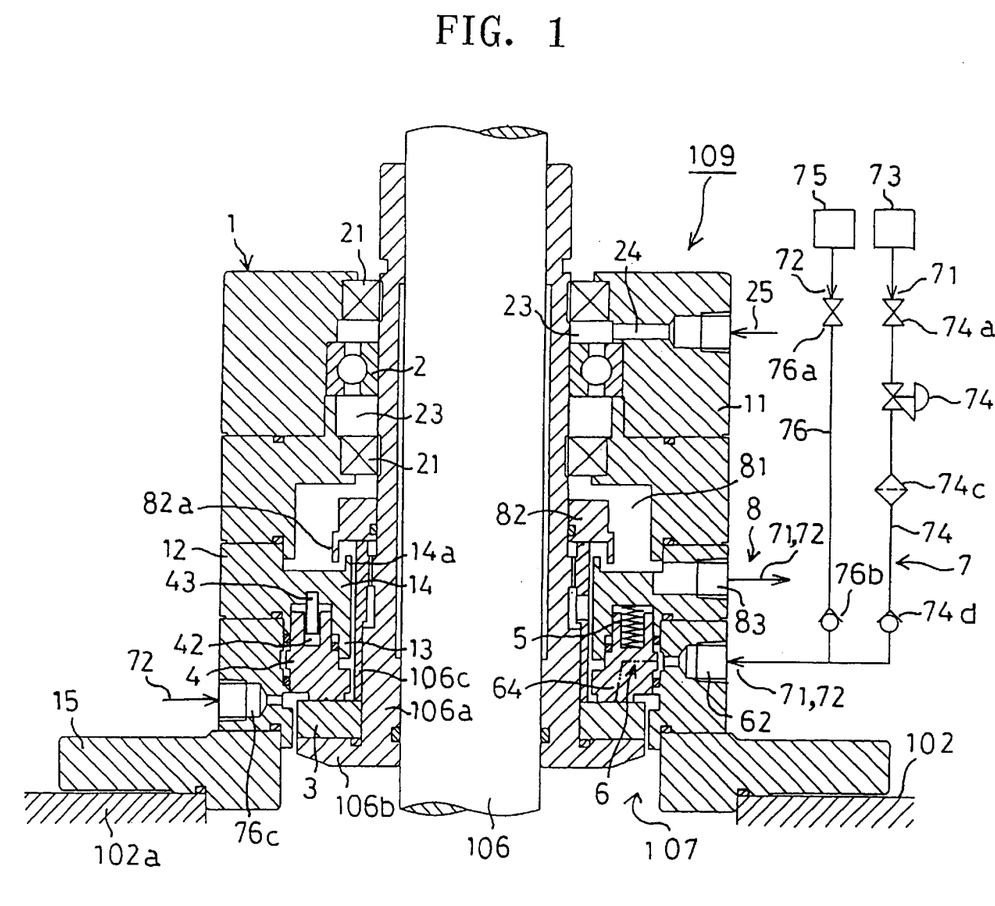
FIG. 1 is a vertical, sectional view of a shaft seal apparatus of the present invention.
Figure 2:
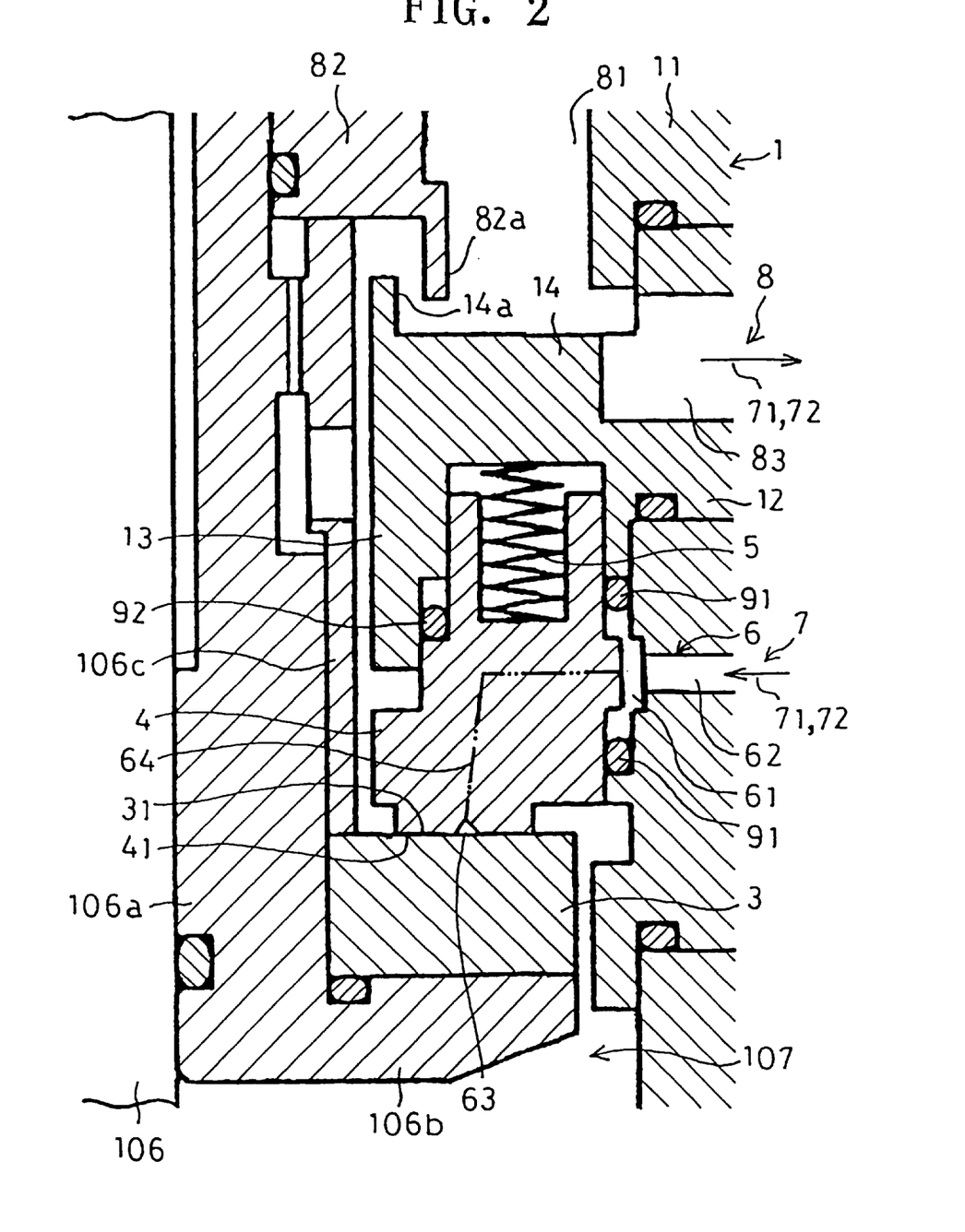
FIG. 2 is an enlarged view of the core part of FIG. 1.
Figure 3:
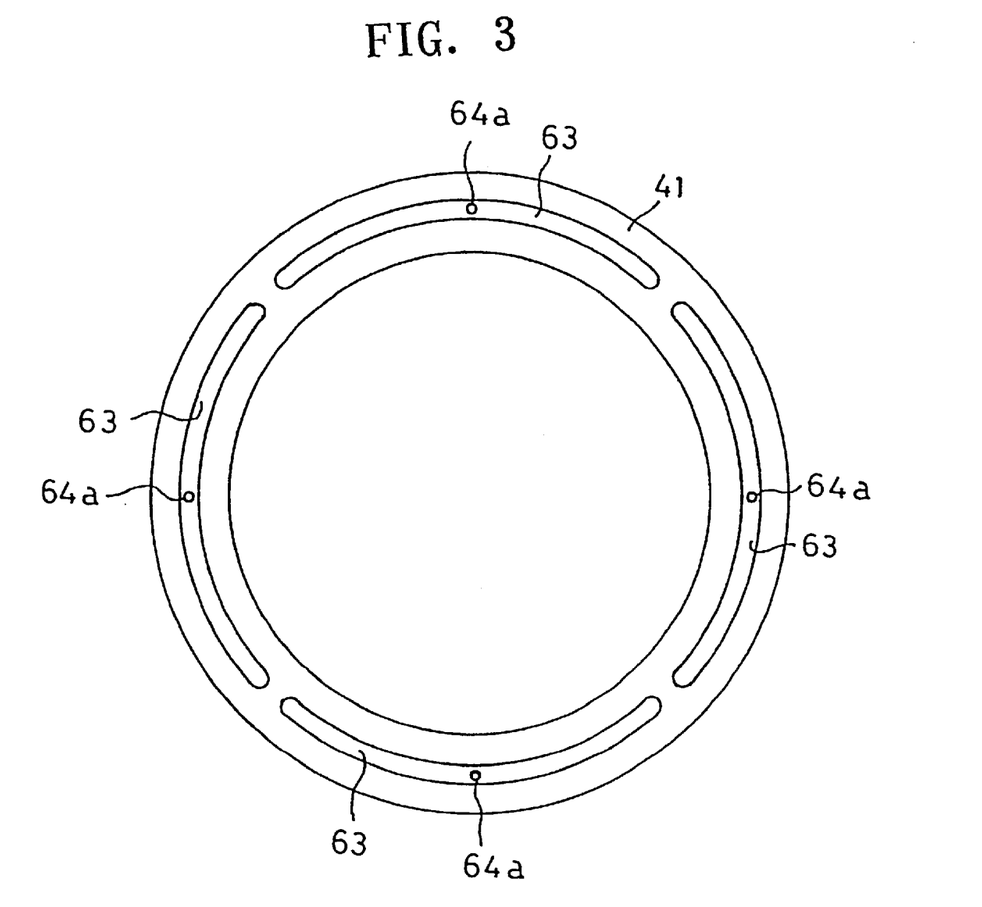
FIG. 3 is a front view of the seal end face of the stationary seal ring of the shaft seal aparatus.

FIGS. 1 to 3 show an example of the present invention applied to the shaft seal apparatus 109 of the agitator 101 for fermentation treatment shown in FIG. 5.

The shaft seal apparatus 109 in this example is an externally pressing type non-contacting seal comprising, as illustrated in FIGS. 1 and 2, a seal case 1 mounted in a rotary shaft penetrating portion 102a of a tank shell 102 forming a fermentation tank 107; a connecting means 2 which connects the seal case 1 and an agitator shaft or rotary shaft 106 extending down through the seal case 1 and the rotary shaft penetrating portion 102a such that the shaft 106 and the seal case 1 are rotatable relative to one another but unmovable relative to one another radially; a rotary seal ring 3 provided inside the seal case 1 and fixed to the rotary shaft 106; a stationary seal ring 4 provided in the seal case 1 opposite to the rotary seal ring 3 and freely movable in the direction of the shaft axis; a thrusting member 5 mounted between the seal case 1 and the stationary seal ring 4 so as to press the stationary seal ring 4 against the rotary seal ring 3; a gas feeding channel 6 comprising a series of gas passages running through the seal case 1 and the stationary seal ring 3 and opening between the opposing seal end faces 31 and 41 of the two seal rings 3 and 4; a gas jetting mechanism 7 to jet a seal gas 71 or a sterilization gas 72 selectively into between seal end faces 31 and 41 from gas feeding channel 6; and a draining mechanism to discharge gases 71 and 72. Shaft seal apparatus 109 is arranged to seal the tank inner space 107, that is, the peripheral region outside of the seal rings 3 and 4 and the relatively rotating portion of the seal rings 3 and 4 while holding the two seal ends 31 and 41 in a non-contact state by jetting seal gas 71 into between the two seal end faces.

The seal case 1, as shown in FIG. 1, comprises a cylindrical main body 11; a retainer portion formed out of three parts 12, 13, and 14 provided at the lower end section of main body 11; and a circular flange portion 15 provide at the lower end of main body 11. Seal case 1 is mounted on the rotary shaft penetrating portion 102a of the tank shell 102 by means of the flange portion 15 such that seal case 1 surrounds rotary shaft 106 concentrically. The retainer portion is of a double cylindrical construction opening downward with cylindrical outer retainer 12 and inner retainer 13 connected by circular back wall 14.

Coupling member 2 comprises, as shown in FIG. 1, a bearing mounted between the upper section of the main body 11 of seal case 1 and the cylindrical sleeve 106a mounted on the rotary shaft 106. Coupling member 2 connects the seal case 1 and the rotary shaft 106 such that the two are rotatable relative to one another and non-movable relative to one another in the radial direction and the axial direction. Lubrication spaces 23, 23 kept air-tight by oil seals 21, 21 provided above and under the coupling member bearing 2 are formed between the main body 11 of seal case 1 and the sleeve 106a of rotary shaft 106. It is designed so that a lubricant (such as grease) 25 injected in to the lubrication spaces 23, 23 from a lubricant path 24 lubricates bearing 2.

Rotary seal ring 3 as illustrated in FIGS. 1 and 2 is fit into the lower part of sleeve 106a and clamped non-movable in the axial direction and relatively non-rotatable between a circular jaw portion 106b formed integrally on the lower part of the sleeve 106a and a cylindrical clamping sleeve 106c fit into the lower section thereof.

The stationary seal ring 4, which is shown in FIGS. 1 and 2, is held in the seal case with the lower end face, that is, the end face 41 of the stationary seal ring 4, opposite to and concentrically with the upper end face of the rotary seal ring 3, that is, the rotary seal end face 31, such that the ring 14 is slidable in the axial direction and relatively non-rotatable. To further illustrate, a pair of first O rings 91 and 91, placed a specific distance apart in the vertical direction from each other are provided as a secondary seal on the periphery of the stationary seal ring 4 in such a way that the stationary seal ring 4 is held by the inner cylindrical surface of the outer retainer 12 of the retainer portion and is slidable in the vertical direction. On the inner cylindrical surface of the stationary seal ring 4 a second O ring 92 is provided as a secondary seal in such a way that the stationary seal ring 4 is held by the outer circumferential surface of the inner retainer 13 of the retainer portion and is slidable in the vertical direction. The stationary seal ring 4 has engaging holes 42 on its upper end face or the back side as shown in FIG. 1. Rotation stopper pins 43 embedded in the back wall 14 are engaged with these holes. In this manner, the stationary seal ring 4 is kept from rotating in relation to the seal case 1 while being allowed to move in the axial or vertical direction within a specific distance.

The thrusting member 5 is formed of one or a plurality of coil springs (a single coil spring is shown in the drawings) placed between the back side of the stationary seal ring 4 and the back wall 14 of the retainer portion to thrust the stationary seal ring 4 against the rotary seal ring 3 as shown in FIGS. 1 and 2.

Gas feeding channel 6 comprises, as shown in FIGS. 1 to 3, a circular interconnecting space 61, formed between the outer circumferential surface of the stationary seal ring 4 and the inner cylindrical surface of the outer retainer 12 as shown in FIGS. 1 to 3, and sealed by the upper and lower first O ring s 91 and 91; a passage 62 on the seal case side extending from the outer circumferential surface of seal case 1 to the interconnecting space 61 through the outer retainer 12; a plurality of static pressure generating grooves 63 formed on the stationary seal ring end surface 41; and a passage 64 on the seal ring side penetrating the stationary seal ring 4 and extending from the interconnecting space 61 to the static pressure generating grooves 63. Each of the static pressure generating grooves 63 is a circular arc-formed recess and forms a circle concentric with the stationary seal end face 41 as shown in FIG. 3. It is noted that the downstream end of the passage 64 on the seal ring side is branched out, with each branch terminal 64a opened at each static pressure generating groove 63.

The gas jetting mechanism 7, as shown in FIG. 1, comprises a seal gas supply pipe 74 led from a seal gas supply source 73 and having its downstream end connected to the passage 62 on the seal case side; a seal gas supply valve 74a, a pressure control valve 74b, a filter 74c, and a check valve 74d all provided in the seal gas supply pipe 74; a sterilization gas supply pipe 76 led from a sterilization gas supply source 75 and having its downstream end connected to the seal gas supply pipe 74 at the downstream side of the check valve 74d; and a sterilization gas supply valve 76a and a check valve 76b provided in the sterilization gas supply pipe 76. Gas jetting mechanism 7 is arranged to feed the seal gas 71 or the sterilization gas 72, as desired, into the gas feeding channel 6 at a higher pressure than the pressure level of tank inner space 107.

In normal operation, where the shaft needs to be sealed by the shaft seal apparatus 109, the seal gas supply valve 74a is opened while the sterilization gas supply valve 76a is kept closed. Thus the seal gas 71 is supplied to the static pressure generating grooves 63 at a higher pressure than the pressure level of the tank inner space from the seal gas supply pipe 74 through passage 62 on the seal case side, interconnecting space 61, and passage 64 on the seal ring side, so as to generate static pressure between the two seal end faces 31 and 41 and keep them in a non-contacting state. One uses as seal gas 71 gas of a type which would cause no problems even if it were to leak into tank inner space 107. Nitrogen gas is employed in the present embodiment.

Tank inner space 107 may be sterilized with the machine put out of operation and no sealing by the shaft seal apparatus 109 is needed. In the sterilization procedure, the sterilization gas supply valve 76a is opened with the seal gas supply valve 74a kept closed so that the sterilization gas 72 at a suitable pressure (e.g., at the same pressure as that of the seal gas 71) may be fed to the static pressure generating grooves 63 from the sterilization gas supply pipe 76 through the downstream portion of the seal gas supply pipe 74 (a portion of the seal gas supply pipe 74 downstream of a location at which the pipe 76 is connected to the pipe 74), the passage 62 on the seal case side, the interconnecting space 61, and the passage 64 on the seal ring side.

The sterilization gas 72 is the same gas as is used for sterilization of the tank inner space 107. In the present embodiment, high temperature steam is used.

It is noted that sterilization gas 72 is led from the same sterilization gas supply source 75 for sterilization of the tank inner space 107. In the present embodiment, furthermore, a sterilization gas passage 76c is formed through the outer retainer 12 of seal case 1 and this sterilization gas passage 76c is connected to the sterilization gas supply pipe 76 so as to jet a part of the sterilization gas or steam 72 supplied from the sterilization gas supply pipe 76 onto the outer circumferential surface of the opposing portion of the seal rings 3 and 4.

The draining mechanism 8 includes, as shown in FIGS. 1 and 2, a drain space 81 or an inner space of the seal case 1 shielded from the tank inner space 107 and the lubrication space 23 by the seal end faces 31 and 41 and the lower oil seal 21; a slinger 82 provided in the drain space 81 and fixed to the sleeve 106a; and a discharge channel 83 leading through the main body 11 of the seal case 1 and opening at the lower end side of the drain space 81. The slinger 82 is provided with a circular protrusion 82a on the peripheral edge thereof. The upper end of a circular protrusion 14a extending from the inner circumferential edge of the back wall 14 projects inside the inner circumferential surface of this circular protrusion 82a. The discharge channel 83 is opened at a level matching, in the vertical direction, the circular protrusions 14a and 82a. In the draining mechanism 8, gases 71 and 72 flow out into the drain space 81 through space between the seal end faces 31 and 41 and flow through space between the two protrusions 14a and 82a and are discharged from the discharge channel 83. The gases 71 and 72 are guided by the circular protrusion 82a to flow into the discharge channel 83, from where the gases are discharged quickly and smoothly. There is little possibility that the gases will flow upward instead of being discharged through discharge channel 83. Therefore, there is no concern that the high temperature steam 72, for example, will rise to a level higher than discharge channel 83. Oil seal 2, therefore, will not be exposed to high temperature deterioration.

The component parts of the shaft seal apparatus 109 (including the sleeves 106a and 106c) may be made from stainless steel (e.g., JIS designation SUS 316), taking into consideration fermentation temperature and the necessity for freedom from contamination.

When a seal gas is provided between a rotary seal ring 3 and a stationary seal ring 4, a fluid film (static pressure) of seal gas is formed between the seal rings 3 and 4 for keeping the seal rings 3 and 4 in a non-contact state, with the seal rings 3 and 4 spaced from each other by a small distance. At the area where the fluid film is formed, that is, the area between seal ring end faces 31 and 41, the region outside of the apparatus and the region inside the apparatus are separated and sealed from one another.

In order to avoid contamination, the seal rings 3 and 4 are made of materials, for example, respectively, stainless steel and carbon, that neither decompose nor produce dust. Seal end faces 31 and 41 may wear as a result of contact between them that occurs during, e.g., cessation of operation. Hence, the surface (seal end face 31) of the rotary ring 3 made of stainless steel is provided with a wear-resistant ceramic coating layer made of, for example, $CrO_2$. Since stationary ring 4 is made from carbon which is high in lubricating effect, such as sintered carbon, that is, powdered carbon formed into the shape of the ring and then sintered, the surface (seal end face 41) of stationary seal ring 4 needs no coating. Where one seal end face (in this case, seal end face 41) is high in lubrication, increased rotational torque and lessened wear are obtained when starting and stopping relative rotation of the seal end faces.

Because seal rings 3 and 4 are made of different materials as described, any contact wear which does occur will occur at the carbon seal. This facilitates maintenance of the apparatus, because it will be necessary to change only one of the two seal rings.

The shaft seal apparatus thus prepared according to the present invention can seal the tank inner space 107 perfectly without causing such problems as encountered with the prior art which was discussed earlier in this specification.

To illustrate further, in normal operation of fermentation treatment by the stirrer 101, seal gas supply valve 74a is opened with sterilization gas supply valve 76a kept closed so that the seal gas 71 is fed into between seal end faces 31 and 41 through seal gas feeding channel 6 to generate an end face opening force therebetween. This opening force is generated by a static pressure produced by the seal gas 71 led to the static pressure generating grooves 63. Therefore, seal end faces 31 and 41 are held in a non-contact state wherein an equilibrium is established between the opening force and the closing force (produced by spring 5 pressing stationary seal ring 4 toward rotary seal ring 3). Since the pressure of the seal gas 71 is higher than that in tank inner space 107, the fluid (fermentation gas, etc.) in the tank is not allowed to enter between the seal end faces 31 and 41. Thus, the tank inner space 107 is completely sealed, precluding the possibility of contaminating the environment.

That arrangement exhibits a hygienic seal function, because tank inner space 107 is sealed with seal end faces 31 and 41 kept in a non-contact state. Thus no wear dust produced by contact between faces 31, 41 finds its way into tank inner space 107. It is also noted that while the seal gas 71 may be led into tank inner space 107 through between seal end faces 31 and 41, the seal gas 71 is nitrogen gas, which would not cause problems even if it might leak into tank inner space 107. That is, possible leakage of the seal gas 71 into tank inner space 107 would not constitute a problem. It is further noted that although the seal gas 71 is continuously fed while stirrer 101 is in operation, the operation is started and ended this way: stirrer 101 is started (with the rotary shaft driven) only after the seal gas 71 is fed and the seal end faces 31 and 41 are held in a right non-contact state. The supply of the seal gas 71 is cut off only after the stirrer is stopped with the rotary shaft 106 coming to a complete standstill.

As mentioned earlier, tank inner space 107 of stirrer 101 is sterilized by jetting steam periodically or as necessary. In this sterilization operation, the parts of the shaft seal apparatus which face the tank inner space 107 can be well sterilized by feeding steam 72 through gas feeding channel 6.

That is, if with the rotary shaft at a standstill the sterilization gas supply valve 76a is opened with the seal gas supply valve kept closed and then steam 72 is supplied through gas feeding channel 6, steam 72 reaches static pressure generating grooves 63 through gas feeding channel 6, passes through between seal end faces 31 and 41, and flows into tank inner space 107 and drain space 81. In the initial stage, seal end faces 31 and 41 are in contact with each other, but steam 72, which is at the same high pressure as the seal gas 71, opens and separates seal end faces 31 and 41 just as the seal gas 71 does and jets into tank inner space 107 and drain space 81.

Therefore, the steam 72 evenly reaches not only the inside of gas feeding channel 6 but also seal end faces 31 and 41 in a contact state, to effect through sterilization. The steam 72, which jets into tank inner space 107 through between seal end faces 31 and 41, comes into contact with the parts of the shaft seal apparatus which face tank inner space 107 (including the outer circumferential surfaces of seal rings 3 and 4) and flows into tank inner pace 107. Thus those parts of the apparatus are sterilized sufficiently. Those parts of the apparatus are additionally treated by the steam 72 which is jetted from sterilization gas channel 76c toward the outer circumferential surface of the contact area between seal rings 3 and 4.

When producing a static pressure with the seal gas 71 led to static pressure generating grooves 63 to hold seal end faces 31 and 41 in a non-contact state, in order to provide for good sealing function it is necessary to keep seal end faces 31 and 41 parallel to each other and concentric with each other. Where the mounting of seal case 1 on tank shell 102 is imprecise, or if rotary shaft 106 vibrates, parallelism and concentricity of the seal end faces will be lost, resulting in poor sealing function. Especially with a type of stirrer 101 as aforesaid in which the rotary shaft 106 is supported by means of the bearing 105 at the upper part alone, the shaft tends to vibrate and it is difficult to obtain a satisfactory sealing function.

In the aforesaid shaft seal apparatus 109 of the present invention, however, the seal case 1 and the rotary shaft 106 are engaged via a coupling member bearing 2 such that the seal case 1 and the rotary shaft 106 are relatively rotatable but are relatively non-movable in the radial direction. Even if the shaft vibrates there will be no change in relative position, therefore, between the rotary seal ring 3 provided on the rotary shaft 106 and the stationary seal ring 4 mounted in the seal case 1. That is, the seal rings 3 and 4 are held in a relatively constant relation of position. Thus the seal end faces 31 and 41 are kept in proper parallelism and concentricity, and they exhibit good sealing function.

In addition, the rotary shaft 106 is also held by means of seal case 1 and bearing 2 mounted in the rotary shaft penetrating portion 102a of tank shell 102. That is, rotary shaft 106 is supported by two bearings, bearing 105 at a point apart from the tank shell 102 and also bearing 2 at a point dose to tank shell 102. Thus the shaft vibration caused by the stirring resistance acting on the agitation propellers 108, 108 can be controlled to the maximum possible extent, with the stirring effect improved. It is noted also that seal case 1 is engaged with rotary shaft 106 via bearing 2. Thus the relation of position between seal case 1 and rotary shaft 106 is kept constant by bearing 2, and it is easy to install the seal case 1 on the tank shell 102 with precision.

As set forth above, shaft seal apparatus 109 seals tank inner space 107 by feeding the seal gas 71 at a pressure higher than that in the tank into between the seal end faces 31 and 41, keeping those seal end faces in a non-contact state. Thus leakage from tank inner space 107 can be completely shut off. Also, there is no contact wear dusting between the seal end faces 31 and 41, and thus there is no concern that wear dust will fall into tank inner space 107. In addition, a sterilization gas 72 such as steam is jetted from between the seal end faces 31 and 41 to the outer and inner circumferential surfaces of those seal end faces. Therefore, the parts of the shaft seal apparatus difficult to sterilize, especially the seal end faces 31 and 41 which face tank inner space 107, can be sterilized well. Thus it is possible according to the present invention to exercise hygienic control effectively and sufficiently on tank inner space 107 and the aforesaid parts of the shaft seal apparatus.

While there has been described a preferred form of the present invention, it is understood that the invention is not limited thereto, and that changes and variations may be made without departing from the basic principle of the invention.

Figure 4:
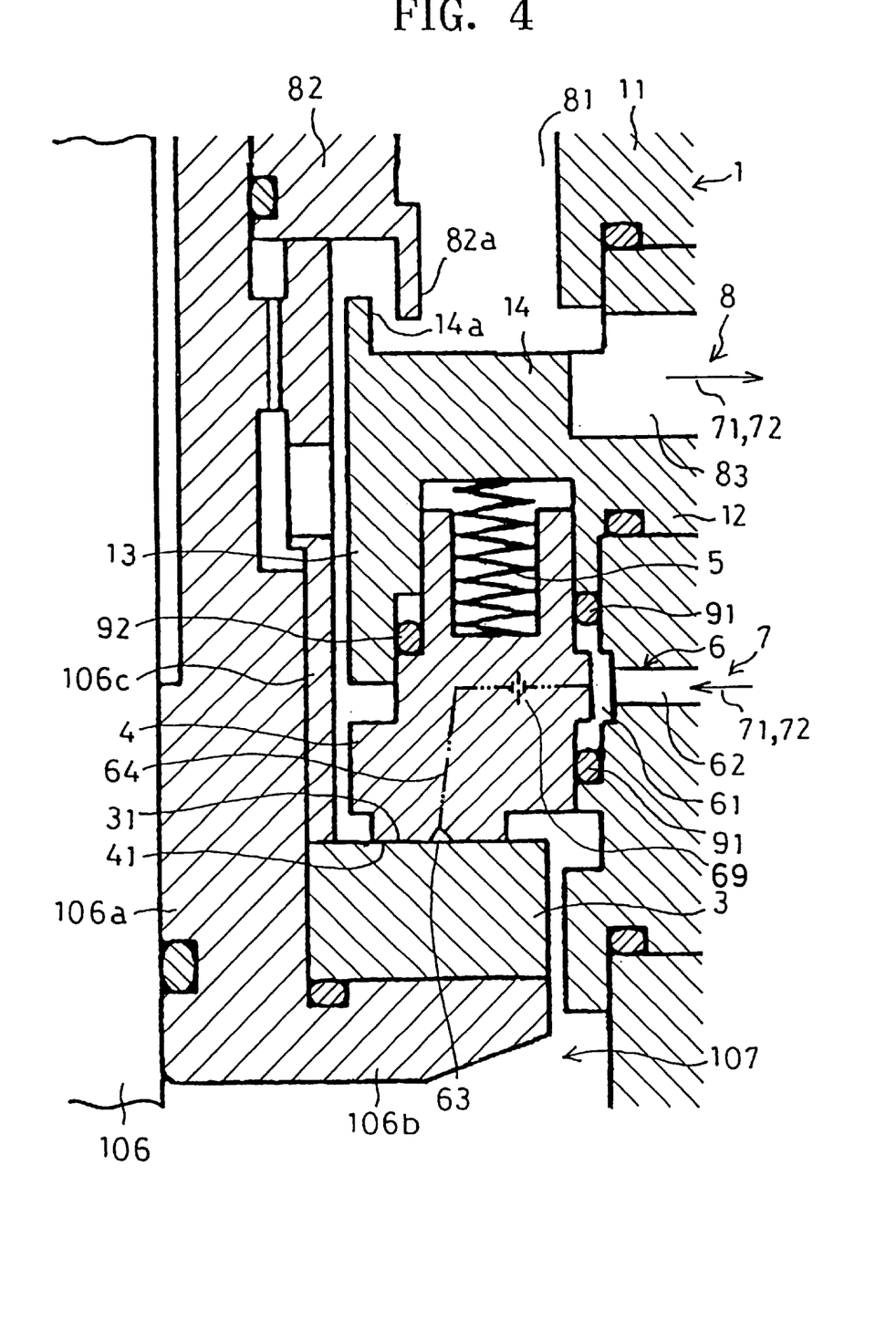
FIG. 4 is a vertical, sectional view of a variation example which view corresponds to FIG. 2.

For example, a squeezer such as an orifice, capillary tube, or porous member may be provided at a suitable place of the channel 6 (as at the gas passage 64 on the seal ring side) as shown in FIG. 4, so that the gap between the seal end faces 31 and 41 will be automatically adjusted. In this arrangement, when the gap between the seal end faces 31 and 41 increases because of vibration of the rotary equipment (stirrer 101) or the like, the flow rate of the seal gas flowing from the static pressure generating grooves 63 to between the seal end faces 31 and 41 and the flow rate of the seal gas flowing to the static pressure generating grooves 63 through the squeezer 69 will be out of balance. Then the pressure within the static pressure generating grooves 63 decreases, and the opening force will be smaller than the closing force. As a result, the gap between the seal end faces 31 and 41 will decrease to a proper size. On the other hand, when the gap between the seal end faces 31 and 41 is too small, the pressure in the static pressure generating grooves 63 will rise in the same mechanism, the opening force will be greater than the closing force, and the gap between the seal end faces 31 and 41 will increase to a proper size.

In another variation, the static pressure generating groove 63 can be in any form. For example, a groove may be formed so that the groove is in the form of a circle concentric with the seal end face 41.

The shaft seal apparatus 109 of the present invention is applicable as means for shaft sealing not only in a vertical type fermentation stirrer 101 but also in a variety of other kinds of rotary equipment which require vigorous sterilization by a sterilization gas such as steam. Such equipment includes, e.g., agitators and mixers for use in the production of pharmaceuticals, foodstuffs, and the like. Unlike the dynamic pressure type non-contact seals in which the seal end faces are held in a non-contact state by dynamic pressure generated by the relative rotation thereof, a shaft seal apparatus of the present invention is suitable for use in rotary equipment in which the revolution of the rotary shaft is not fast enough to generate the required dynamic pressure. A shaft seal apparatus of the present invention is also suitable for use in rotary equipment for the treatment of toxic substances whose leakage from a tank inner space must be prevented completely. Whichever the type of rotary equipment to be sealed, the properties and pressure of the seal gas and sterilization gas to be jetted between the seal end faces 31 and 41 will be selected according to the purpose of the application and the nature of the rotary equipment.

What is claimed is:

1. A shaft seal apparatus that comprises:
   a tank shell;
   rotary equipment, including a rotary shaft vertically penetrating the tank shell at a rotary shaft penetrating position;
   a seal case mounted in the rotary shaft penetrating position of the tank shell and encasing a portion of the rotary shaft, said seal case including a retainer portion comprising a cylindrical outer retainer, an inner retainer and a circular back wall connecting the outer retainer and the inner retainer, the circular back wall having an outer periphery portion;
   a rotary seal ring fixed to the rotary shaft of the rotary equipment, and having a seal end face;
   a stationary seal ring held in the retainer portion of the seal case opposite to the rotary seal ring and movable in an axial direction of the rotary shaft wherein an outer periphery portion of the stationary seal ring is held in an inner cylindrical surface of the outer retainer via a first O ring serving as a secondary seal such that the stationary seal ring is slidable in the axial direction while an inner periphery portion of the stationary seal ring is held on an outer periphery portion of the inner retainer via a second O ring serving as a secondary seal such that the stationary seal ring is slidable in the axial direction, the stationary seal ring having a seal end face opposing the seal end face of the rotary seal ring;
   a thrusting member mounted between the circular back wall of the seal case and a back side of the stationary seal ring and thrusting the stationary seal ring against the rotary seal ring, the thrusting member being sealed by the first and second O rings;
   a first circular protrusion extending upward from the outer periphery portion of the circular back wall;
   a slinger fixed to the rotary shaft and provided with a second circular protrusion extending downward from an outer periphery portion thereof, wherein an upper end portion of the first circular protrusion is positioned inside an inner periphery portion of the second circular protrusion;
   a discharge channel penetrating through the seal case and opening opposite to and roughly at the same vertical position as the first and second circular protrusions; and
   a gas feed channel comprising a series of gas passages running through the seal case and the stationary seal ring and opening between the opposing seal end faces of the two seal rings and a gas jetting mechanism to jet a seal gas or a sterilization gas selectively into between the seal end face through the series of gas passages, wherein the first and second circular protrusions are disposed so that gas from the gas feeding channel is guided between the first and second circular protrusions to the discharge channel;
   wherein, in normal operation, the shaft seal apparatus functions to seal at the relatively rotating portions of the seal end faces of the seal rings while holding the seal end faces in a non-contact state by jetting the seal gas into between the two seal end faces, and, in sterilization mode, the sterilization gas is jetted into between the two seal end faces instead of the seal gas, sterilizing at least the series of gas passages and the seal end faces.

2. The shaft seal apparatus of claim 1, wherein the seal gas comprises nitrogen gas at a pressure higher than a pressure in the rotary equipment.

3. The shaft seal apparatus of claim 1, wherein the sterilization gas comprises steam at a pressure equal to a pressure of the seal gas.

4. The shaft seal apparatus of claim 1, wherein the seal case and the rotary shaft are engaged with each other such that the seal case and the rotary shaft are rotatable relative to one another and are non-movable relative to one another in the radial direction.

* * * * *